(12) United States Patent
Schulz et al.

(10) Patent No.: US 10,400,725 B2
(45) Date of Patent: Sep. 3, 2019

(54) ELECTROMAGNETIC ACTUATOR FOR A VALVE MECHANISM

(71) Applicant: Kendrion (Villingen) GmbH, Villingen-Schwenningen (DE)

(72) Inventors: Florian Schulz, Brigachtal (DE); Ralf Heingl, Villingen-Schwenningen (DE); Tsuneo Suzuki, Mönchweiler (DE); Joachim Flühs, Villingen-Schwenningen (DE); Holger Brandenburg, Villingen-Schwenningen (DE)

(73) Assignee: Kendrion (Villingen) GmbH, Villengen-Schwenninge (DE)

( * ) Notice: Subject to any disclaimer, the term of this patent is extended or adjusted under 35 U.S.C. 154(b) by 0 days.

(21) Appl. No.: 15/775,206

(22) PCT Filed: Oct. 31, 2016

(86) PCT No.: PCT/EP2016/076222
§ 371 (c)(1),
(2) Date: May 10, 2018

(87) PCT Pub. No.: WO2017/080861
PCT Pub. Date: May 18, 2017

(65) Prior Publication Data
US 2019/0017480 A1 Jan. 17, 2019

(30) Foreign Application Priority Data
Nov. 11, 2015 (DE) .................. 10 2015 119 462

(51) Int. Cl.
*F16K 31/06* (2006.01)
*F02M 59/36* (2006.01)
(Continued)

(52) U.S. Cl.
CPC ...... *F02M 59/366* (2013.01); *F02M 63/0019* (2013.01); *F02M 63/0071* (2013.01);
(Continued)

(58) Field of Classification Search
CPC ............. F02M 59/366; F02M 63/0071; F02M 63/0019; F02M 2200/8084;
(Continued)

(56) References Cited

U.S. PATENT DOCUMENTS 5,135,027 A * 8/1992 Miki .................. F16K 31/0631
137/596.17
5,156,341 A * 10/1992 Terakado ........... F02M 51/0675
239/585.4
(Continued)

FOREIGN PATENT DOCUMENTS

DE 4013875 10/1991
DE 4305789 9/1994
(Continued)

OTHER PUBLICATIONS

Patent Cooperation Treaty, International Search Report, issued in International Application No. PCT/EP2016/076222, by European Searching Authority, Examiner Robert Barunovic, document of 6 pages, dated Jan. 19, 2017.
(Continued)

*Primary Examiner* — John Bastianelli
(74) *Attorney, Agent, or Firm* — Akerman LLP; Peter A. Chiabotti

(57) ABSTRACT

An electromagnetic actuator for a valve mechanism, in particular in a common rail system of a motor vehicle, comprising an armature tappet for actuating a valve element located in a channel, and comprising a pole core, the armature tappet being movable axially along a central axis of the actuator when an excitation coil of an excitation
(Continued)

system is energized. The pole core therefore has a tubular shape and has a circumferential flange in the area of the pole core end facing the channel, said flange extending inward in relation to the central axis.

18 Claims, 1 Drawing Sheet

(51) Int. Cl.
| | | |
|---|---|---|
| *H01F 3/00* | (2006.01) | |
| *F02M 63/00* | (2006.01) | |
| *F04B 7/00* | (2006.01) | |
| *F04B 53/10* | (2006.01) | |
| *H01F 7/127* | (2006.01) | |
| *H01F 7/16* | (2006.01) | |

(52) U.S. Cl.
CPC ........ *F04B 7/0076* (2013.01); *F04B 53/1082* (2013.01); *F16K 31/0675* (2013.01); *H01F 3/00* (2013.01); *H01F 7/127* (2013.01); *H01F 7/1607* (2013.01); *F02M 2200/8061* (2013.01); *F02M 2200/8084* (2013.01); *F02M 2200/9069* (2013.01)

(58) Field of Classification Search
CPC .... F02M 2200/8061; F02M 2200/9069; H01F 7/1607; H01F 7/127; H01F 3/00; F16K 31/0675; F04B 53/1082; F04B 7/0076
USPC .................................................. 251/129.15
See application file for complete search history.

(56) References Cited

U.S. PATENT DOCUMENTS

| | | | | |
|---|---|---|---|---|
| 5,467,797 A | * | 11/1995 | Seetharaman | B60T 8/3635 137/599.07 |
| 5,782,267 A | * | 7/1998 | Yoo | B60T 8/3635 137/596.17 |
| 2006/0201485 A1 | * | 9/2006 | Usui | F02D 41/20 123/458 |
| 2013/0032742 A1 | * | 2/2013 | Scherer | H01F 7/13 251/129.15 |

FOREIGN PATENT DOCUMENTS

| | | |
|---|---|---|
| DE | 4343879 | 6/1995 |
| DE | 19712618 | 10/1998 |
| DE | 102007028960 | 12/2008 |
| DE | 102007032873 | 1/2009 |
| DE | 102010049022 | 4/2012 |
| DE | 102010062525 | 6/2012 |
| DE | 102012019193 | 3/2014 |
| DE | 102012107764 | 4/2014 |
| EP | 1701031 | 9/2006 |
| JP | 2002310327 | 10/2002 |
| JP | 2007138981 | 6/2007 |

OTHER PUBLICATIONS

German Patent Office, "Office Action," issued in German Patent Application No. DE 10 2015 119 462.7, dated Oct. 17, 2016, document of 14 pages.

* cited by examiner

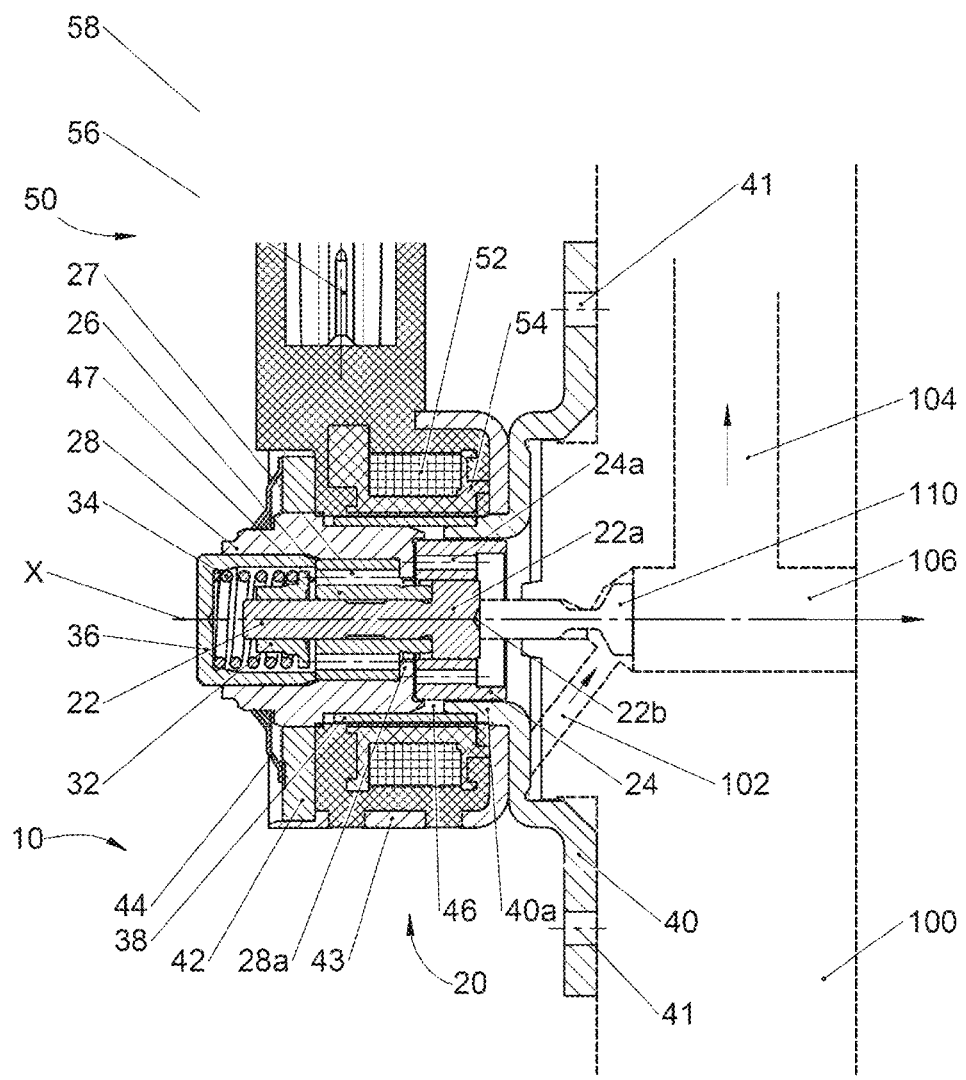

ELECTROMAGNETIC ACTUATOR FOR A VALVE MECHANISM

CROSS REFERENCE TO RELATED APPLICATIONS

This application is a § 371 National Phase of PCT/EP2016/076222, filed Oct. 31, 2016, the entirety of which is incorporated by reference and which claims priority to German Patent Application No. 10 2015 119 462.7, filed Nov. 11, 2015.

BACKGROUND

The application relates to an electromagnetic actuator for a valve mechanism, in particular in a common rail system of a motor vehicle, having the features and structures described herein.

SUMMARY

Such electromagnetic actuators are, for example, known from DE 10 2012 107 764 A1. It discloses an electromagnetic volumetric flow control valve, which is disposed between a low-pressure pump and a high-pressure pump of a common rail system of a fuel injection system. The fuel is conveyed from a fuel tank via a conveying line from the low-pressure pump to the high-pressure pump. The amount of fuel conducted from the high-pressure pump to the high-pressure reservoir, that is, to the common rail system, is controlled by the volume flow control valve mentioned above, which is arranged in the conveying line. The volume flow control valve is designed as a so-called 'normally open' valve, which has the decisive advantage that, in the event of a defect or failure of the valve, fuel can still be conveyed into the rail, that is, the high-pressure reservoir, and, unlike with 'normally closed' valves, no malfunction of the internal combustion engine can occur if the valve is defective or fails.

The problem with using these valves known in the common rail system in this application is the fact that they are typically designed as control valves. Such control valves require a complicated design of the pole core with control cone and a corresponding adjustment of the associated armature. Furthermore, the known volume flow control valves are very adjustment-sensitive and therefore need to be installed with high precision. This results in an increased installation effort. The installation space of these electromagnetic actuators is relatively large.

This is where the present application comes into play.

The electromagnetic actuator according to the present disclosure is essentially based on providing a pole core which at its front end has a flange which projects inwards and faces the central axis. This step makes it possible that the entire magnetic circuit of the electromagnetic actuator can be designed in a relatively compact manner.

In addition, this step makes it possible in a further development of the disclosure to clamp a guide sleeve of the actuator between the pole core and a housing part. This housing part can for example be a housing cover and particularly a spring cover of the actuator. Overall, the entire design of the electromagnetic actuator is characterized in that, unlike previous solutions, no O-rings whatsoever are required for sealing the actuator.

Another advantage of the actuator according to the disclosure is the fact that its components can easily be assembled, such that a preassembled structural unit can be provided, which just has to be extrusion-coated with an excitation coil including a coil support and plug part. It is advantageously no longer necessary that the components undergo any complicated subsequent processing.

Further developments of the disclosure are described further in the structures and features recited herein.

BRIEF DESCRIPTION OF THE DRAWINGS

An embodiment of an electromagnetic actuator according to the disclosure is shown in the only figure.

FIG. 1 is a cross-sectional view of an embodiment of a electromagnetic actuator as described herein.

DETAILED DESCRIPTION

The electromagnetic actuator shown in the only FIGURE has the reference number 10 and is used in the present embodiment to adjust a valve element 110 in a channel 100 within a common rail system of a motor vehicle. The channel 100 is a part of the common rail system of a motor vehicle, comprising an inlet line 102 for inflow, an outlet line 104 for outflow, and another line 106 for another outlet. The valve element 110 can for example be a tappet, which is pressed upwards by a spring mechanism not shown in the FIGURE and whose upper end shown in the FIGURE presses against an armature tappet 22 of the electromagnetic actuator 10.

The FIGURE shows the electromagnetic actuator 10 in its energized state. This means that the armature tappet 22, which is centered relative to the central axis X, is in its uppermost end position. The valve element 110 also is in its uppermost end position due to the spring action of the spring mechanism not shown. The valve element 110 closes the inlet 102, such that no more fuel can get from the inlet 102 to the outlets 104, 106.

The electromagnetic actuator 10 comprises the armature tappet 22 mentioned above. The armature tappet 22 is part of an actuating system 20, which can be actuated via an excitation system 50 yet to be explained such that the armature tappet 22 can be moved from its resting position into the active position shown in FIG. 1.

The armature tappet 22 is axially guided in a guide sleeve 26 and has a widened portion 22a on its front end which faces the channel 100. In this widened portion 22a of the armature tappet 22, the armature tappet 22 is, for example, twice the diameter than in the other portion. On its front end facing the channel 100, the armature tappet 22 has a notch 22b in which the valve element 110 can be guided in a centered manner.

The narrower portion of the armature tappet 22 is axially guided in the guide sleeve 26 mentioned above. The widened portion 22a is fixedly connected with an annular armature 24, in that the widened portion 22a of the armature tappet 22 is pressed into the inner wall of said armature 24. The guide sleeve 26 is inserted in a tubular shaped pole core 28. Again, the guide sleeve 26 is pressed into the inner wall of this pole core 28.

As shown in the FIGURE, the pole core 28 is designed as a tubular shaped element and has a largely constant diameter along the central axis X. However, a circumferential flange 28a projects inwards in relation to the central axis X from the front portion of the pole core which faces the channel 100. The inner diameter of said circumferential flange 28a at least approximately corresponds to the inner diameter of the opposite, annular armature 24. When the electromagnetic actuator 10 is energized, an optimum flow is achieved due to the inward projecting and circumferential flange 28a of the pole core 28.

The armature tappet 22 is fixedly connected to a spring plate 32 at its end opposite its widened portion 22a. The bottom end of a spring mechanism 34 rests against this spring plate 32, which in this case is a coil spring. At its upper end, this spring mechanism 34 is supported against the inner wall of a housing part, in this case on a U-shaped spring cover 36. This spring cover 36 is made of a non-magnetic material, preferably of stainless steel.

A plate-shaped housing cover 42 which terminates a pot-shaped housing part 43 is disposed in the upper section of the electromagnetic actuator 10. The housing cover 42 is held clamped by a clamping ring 44, which is supported, on the one hand, on the outer wall of the pole core 28, and on the other hand on the upper outer wall of the housing cover 42.

An excitation coil 52 which sits on a coil support 54 is located coaxially with the central axis X between the pot-shaped housing 43 and the pole core 28. The coil support 54 and the excitation coil 52 are disposed coaxially with the central axis X of the electromagnetic actuator 10. The excitation coil 52 is electrically connected to contact pins 56. The excitation coil 52 can be energized via these contact pins 56. The contact pins 56 sit in a plug housing 58, which is designed as an injection-molded part of plastic.

As can be seen from the FIGURE, the electromagnetic actuator 10 sits on a flange 40, which is provided with mounting holes 41 for fastening the electromagnetic actuator 10, for example to the engine casing of a motor vehicle. The fastening flange 40 has a circumferential wall 40a which projects into the electromagnetic actuator 10. As the FIGURE shows, a housing ring 38 which extends upwards is fixedly molded, for example, welded, to said circumferential wall 40a. This housing ring 38 extends between the coil support 54 and the outer wall of the pole core 28.

When assembling the electromagnetic actuator 10, the preassembled structural unit consisting of armature tappet 22, guide sleeve 26, armature 24, spring plate 32, spring mechanism 34, and spring cover 36 is pressed in between the housing ring 38. In the next step, the housing cover 43 is placed on top and clamped with the clamping ring 44. In a subsequent step, the coil support 54 together with the excitation coil 52 can be slid around and onto the housing ring 38. Expediently, the plug housing 58 is already molded onto the coil support 54. Overall, this arrangement results in a very simple assembly option of the entire electromagnetic actuator 10. O-rings and complicated subsequent processing when assembling the actuator 10 can be eliminated. In addition, the actuator 10 has a compact design.

As can further be seen form the FIGURE, both the armature 24 and the guide sleeve 26 have compensating holes 24a and 27. These compensating holes 24a and 27 are interconnected, for example by openings of the inwardly projecting flange 28a of the pole care 28.

As explained above, the only FIGURE shows the electromagnetic actuator 10 in its energized state, that is, when energized by the excitation coil 52. In this case, the armature tappet 22 is deflected upwards to the maximum due to the energization of the excitation coil 52. The gap 47 between the spring plate 32 and the guide sleeve 26 is at its maximum in this position. But the gap 46 between the projecting flange 28a and the armature 24 is at its minimum.

It should be noted in addition that the guide sleeve 26 is designed such that it projects through the pole core 28 with its inwardly projecting flange 28a towards the channel 100 and reaches the widened portion 22a of the armature tappet 22. A circumferential wall of the guide sleeve 26 is in contact with the circumferential flange 28a of the pole core 28, while its opposite upper wall is in contact with the circumferential wall of the spring cover 36. The guide sleeve 26 is firmly clamped between the circumferential flange 28a and the spring cover 36 and thus securely held, without requiring any welded connections.

LIST OF REFERENCE SYMBOLS

10 Electromagnetic actuator
20 Actuating system
22 Armature tappet
22a Widened portion
22b Notch
24 Armature
24a Holes
26 Guide sleeve
27 Hole
28 Pole core
28a Annular pole core flange
32 Spring plate
34 Spring mechanism
36 Spring cover
38 Housing ring
40 Fastening flange
40a Circumferential wall
41 Mounting hole
42 Housing cover
43 Pot-shaped housing
44 Clamping ring
46 First gap
47 Second gap
50 Excitation system
52 Excitation coil
54 Coil support
56 Contact pin
58 Plug housing
100 Channel
102 Inlet
104 Outlet
106 Outlet
110 Valve element
X Central axis.

The invention claimed is:

1. An electromagnetic actuator for a valve mechanism, in a common rail system of a motor vehicle, comprising:
   an armature tappet for actuating a valve element located in a channel, the armature tappet being movable axially along a central axis of the electromagnetic actuator when an excitation coil of an excitation system is energized;
   a pole core having a tubular shape and a circumferential flange in an area of the pole core end facing the channel;
   wherein the flange extends inwards in relation to the central axis;
   wherein the armature tappet is guided in a guide sleeve and the guide sleeve is held clamped between an inner circumferential flange of the pole core and a housing part of the actuator; and
   wherein the housing part is a U-shaped spring cover, in which a spring mechanism is disposed, wherein the spring mechanism is supported in a spring cover and rests against a spring plate fastened to the armature tappet.

2. The electromagnetic actuator according to claim 1, wherein the spring cover is formed of a non-magnetic material.

3. The electromagnetic actuator according to claim 1, wherein the pole core and the guide sleeve are compressed together.

4. The electromagnetic actuator according to claim 1, wherein a tubular shaped armature is provided in which the armature tappet is held compressed with a front part facing the channel.

5. The electromagnetic actuator according to claim 1, wherein the spring plate is fixedly connected to the armature tappet.

6. The electromagnetic actuator according to claim 1, wherein the spring cover is compressed together with the pole core.

7. The electromagnetic actuator according to claim 1, wherein the pole core forms a preassembled structural unit with the spring cover, the spring mechanism, the spring plate, the armature tappet, the armature, and the guide sleeve, wherein the preassembled structural unit is fixedly connected to a fastening flange.

8. The electromagnetic actuator according to claim 7, wherein the fastening flange is provided with a housing ring into which the preassembled structural unit is inserted in a press fit.

9. The electromagnetic actuator according to claim 1, wherein an excitation coil is disposed coaxially with the central axis, wherein the excitation coil sits on a coil support and a plug housing is molded to the coil support as an extrusion coated part.

10. The electromagnetic actuator according to claim 1, wherein the guide sleeve projects at least partially into the flange of the pole core.

11. An electromagnetic actuator for a valve, comprising:
a housing with a spring cover;
tubular shaped armature;
an armature tappet for actuating a valve element located in a channel, the armature tappet being disposed in the housing, held compressed in the tubular shaped armature with a front part facing the channel, and movable axially along a central axis of the actuator when actuated and having a spring plate;
a guide sleeve in which the armature tappet is guided;
a pole core having a circumferential flange at an end of the pole core facing the channel, wherein the circumferential flange extends inwards in relation to the central axis; and
a spring disposed between the spring cover and the spring plate;
wherein the pole core and the guide sleeve are compressed together.

12. The electromagnetic actuator for a valve of claim 11, wherein the spring cover is formed of a non-magnetic material.

13. The electromagnetic actuator for a valve of claim 11, wherein the spring plate is fixedly connected to the armature tappet.

14. The electromagnetic actuator for a valve of claim 11, wherein the spring cover is compressed together with the pole core.

15. The electromagnetic actuator for a valve of claim 11, wherein the pole core forms a preassembled structural unit with the spring cover, the spring, the spring plate, the armature tappet, the armature, and the guide sleeve, wherein the preassembled structural unit is fixedly connected to a fastening flange.

16. An electromagnetic actuator for a valve, comprising:
a preassembled structural unit comprising a pole core having a circumferential flange at an end of the pole core facing a channel, wherein the circumferential flange extends inwards in relation to the central axis, the preassembled structural unit comprising a spring cover, a spring, a spring plate, an armature, an armature tappet, a guide sleeve in which the armature tappet is guided, wherein the preassembled structural unit is fixedly connected to a fastening flange;
wherein the armature tappet is configured to actuate a valve element located in a channel, the armature tappet being disposed in a valve housing, held compressed in the armature with a front part facing the channel, and movable axially along a central axis of the actuator when actuated and having a spring plate; and
wherein the spring is disposed between the spring cover and the spring plate;
wherein the pole core and the guide sleeve are compressed together.

17. The electromagnetic actuator for a valve of claim 16, wherein the spring plate is fixedly connected to the armature tappet and the spring cover is compressed together with the pole core.

18. The electromagnetic actuator for a valve of claim 16, wherein the spring cover is formed of a non-magnetic material.

* * * * *